US010333378B2

(12) United States Patent
Lerner

(10) Patent No.: US 10,333,378 B2
(45) Date of Patent: Jun. 25, 2019

(54) SPEED RESTRICTION SYSTEM USING EDDY CURRENTS

(71) Applicant: ZIP-FLYER, LLC, New York, NY (US)

(72) Inventor: Shawn Geoffrey Lerner, New York, NY (US)

(*) Notice: Subject to any disclaimer, the term of this patent is extended or adjusted under 35 U.S.C. 154(b) by 0 days.

(21) Appl. No.: 16/120,359

(22) Filed: Sep. 3, 2018

(65) Prior Publication Data
US 2019/0109528 A1 Apr. 11, 2019

Related U.S. Application Data

(63) Continuation-in-part of application No. 15/726,939, filed on Oct. 6, 2017, now Pat. No. 10,065,507.

(51) Int. Cl.
H02K 49/04 (2006.01)
A62B 1/08 (2006.01)

(52) U.S. Cl.
CPC ............. *H02K 49/04* (2013.01); *A62B 1/08* (2013.01)

(58) Field of Classification Search
CPC ....... B60L 7/28; B60L 2200/26; H02K 49/04; H02K 49/043; H02K 49/046; H02K 7/104; H02K 2213/09; A62B 1/08; B60T 13/748; B61H 9/02
USPC ...................................................... 188/267
See application file for complete search history.

(56) References Cited

U.S. PATENT DOCUMENTS

| 4,567,963 | A | 2/1986 | Sugimoto | |
| 5,234,083 | A | 8/1993 | Lee | |
| 6,011,508 | A * | 1/2000 | Perreault | B61L 3/225 246/122 R |
| 6,412,611 | B1 | 7/2002 | Pribonic | |
| 7,018,324 | B1 | 3/2006 | Lin | |
| 7,303,054 | B2 * | 12/2007 | Rosner | B60L 7/28 188/159 |
| 7,836,829 | B2 * | 11/2010 | Burger | A63G 7/00 104/249 |
| 8,025,131 | B1 | 9/2011 | Boren | |
| 8,037,978 | B1 | 10/2011 | Boren | |
| 8,375,865 | B2 | 2/2013 | Zayas | |
| 8,490,751 | B2 | 7/2013 | Allington | |
| 8,851,235 | B2 | 10/2014 | Allington | |

(Continued)

FOREIGN PATENT DOCUMENTS

WO WO-02/085684 A1 10/2002
WO WO-2016/191884 A1 12/2016

OTHER PUBLICATIONS

International Search Report dated Jan. 30, 2019, for PCT Application No. PCT/US2018/054665, filed Oct. 5, 2018, 3 pages.

(Continued)

Primary Examiner — Zachary L Kuhfuss

(57) ABSTRACT

The current subject matter describes a device and system including one or more movable arms containing one or more magnets that are caused to move relative to a non-ferrous material by motion of the device to generate eddy currents that cause a braking of the device. Devices of this disclosure may include one or more trolleys that moving along a coaster track and which contain braking arms having magnets that move due to inertial force and/or can be controlled by a remote server computer based on information obtained from the one or more trolleys as they move along the coaster track.

10 Claims, 16 Drawing Sheets

(56) References Cited

U.S. PATENT DOCUMENTS

| | | | |
|---|---|---|---|
| 9,016,435 B2 | 4/2015 | Allington | |
| 9,242,659 B2* | 1/2016 | Bernier | |
| 10,065,507 B1* | 9/2018 | Lerner | H02K 49/04 |
| 2002/0162477 A1 | 11/2002 | Palumbo | |
| 2002/0179372 A1 | 12/2002 | Schreiber | |
| 2003/0116391 A1 | 6/2003 | Desta | |
| 2004/0055836 A1 | 3/2004 | Pribonic | |
| 2004/0262103 A1 | 12/2004 | Rosner | |
| 2005/0146213 A1 | 7/2005 | Imanishi | |
| 2006/0278478 A1 | 12/2006 | Pribonic | |
| 2008/0110366 A1* | 5/2008 | Burger | A63G 7/00 104/74 |
| 2009/0178887 A1 | 7/2009 | Reeves | |
| 2010/0107919 A1 | 5/2010 | Perekis | |
| 2010/0308149 A1 | 12/2010 | Allington | |
| 2011/0162917 A1 | 7/2011 | Steele | |
| 2012/0055740 A1 | 3/2012 | Allington | |
| 2013/0118842 A1 | 5/2013 | Lerner | |
| 2013/0327242 A1 | 12/2013 | Bernier | |
| 2014/0048639 A1 | 2/2014 | Allington | |
| 2014/0309822 A1* | 10/2014 | Beutler | A63G 7/00 701/20 |
| 2015/0196820 A1 | 7/2015 | Allington | |
| 2017/0237313 A1 | 8/2017 | Diehl | |
| 2017/0244313 A1 | 8/2017 | Diehl | |
| 2017/0274261 A1 | 9/2017 | Allington | |

OTHER PUBLICATIONS

Written Opinion dated Jan. 30, 2019, for PCT Application No. PCT/US2018/054665, filed Oct. 5, 2018, 9 pages.

* cited by examiner

SPEED RESTRICTION SYSTEM USING EDDY CURRENTS

CROSS REFERENCE TO RELATED APPLICATIONS

This application is a continuation-in-part of U.S. application Ser. No. 15/726,939, filed Oct. 6, 2017, titled "Speed Restriction Systems Using Eddy Currents," incorporated herein by reference in its entirety.

TECHNICAL FIELD

The subject matter described herein relates to devices and systems that restrict or otherwise control the linear and/or angular velocity of one or more moving bodies using eddy currents. The subject matter described herein also includes braking systems having one or more movable arms or arm assemblies with one or more magnets that move relative to one or more non-ferrous conductive materials so as to generate eddy currents and provide braking force.

BACKGROUND

Indoor and outdoor high-adventure activity centers and theme parks featuring thrilling amusements like obstacle courses, zip-lining, wall climbs and human coaster rides, are becoming increasingly more popular throughout the world. Paramount considerations for theme parks and other venues offering these attractions include safety, scalability and increased thru-put. These considerations are particularly acute with respect to zip-line courses and human coaster rides, where riders are moving at fast speeds at high elevations and depend on the reliability and operation of the mechanical devices and systems making up the zip-line courses and coaster rides. The theme parks, adventure centers and other venues offering these high-excitement rides also need systems that are easily scalable so as to accommodate various types of riders and ride experiences and that also have satisfactory thru-put, i.e., are able to accommodate multiple riders at the same time on a single ride to keep the size of waiting lines down and/or moving.

Both zip-lining and coastering are amusements that depend upon gravitational force for moving riders, rather than a motor that accelerates and decelerates riders in a controlled manner. More specifically, the zip-line or coaster track(s) over which a rider and the trolley or trolley system traverses often begin at an elevation that is higher than that at which the zip line or coaster track(s) finish. Zip lines and coaster track(s) may also contain varying elevations that cause the rider and its trolley system to accelerate and decelerate and generally move along the zip line or coaster track(s), similar to how a passenger cart moves along a traditional roller coaster. Accordingly, because these amusements do not rely on a motor for controlling movement, but rather simply work on gravitational force, motion of the rider and the trolley must be controlled by braking, dictated either by implementing changes in the grade or elevation of the zip line or coaster track(s) and/or braking components contained on the trolley or trolley system and/or the zip line or coaster track(s) themselves.

Braking based on the grade of the zip line or coaster track(s) has attendant dangers, as the degree of acceleration and deceleration of the trolley will vary with the weight of the rider and the degree of slope of the cable, leaving operators of zip-line and coaster rides with little control over the speed of a rider once the trolley has left the starting location and is moving along the track(s). Accordingly, incorporating braking technologies into the trolley itself has gained favor and become prevalent on zip-line and/or coaster amusements.

With that said, conventional mechanical braking systems implemented directly on trolleys and trolley systems and on zip-line and coaster rides still lack important features, including providing progressive speed restriction of the trolley and its rider at the terminal section of the zip-line and/or coaster where the ride ends, providing a single trolley system that accommodates and performs effective braking for riders of a wide range of sizes (e.g., height and weight) and providing a trolley that can be controlled and brought to a stop as needed at any point along the zip-line or coaster ride.

SUMMARY

Devices and systems are described for providing progressive braking of a trolley or trolley system along a zip line and/or one or more coaster tracks. Devices and systems are also described for providing a trolley or trolley system that is capable of accommodating and performing effective braking for riders of vastly different heights and weights. Devices and systems are also described for providing a trolley or trolley system that can be controlled and stopped at any position along a zip line or one more coaster tracks, for example, to avoid collisions with one or more other trolleys or trolley systems traversing the same zip line or coaster track(s).

Implementations of the disclosure are directed to a coaster system having a trolley configured with one or more braking arms operably coupled to the trolley and having one or more magnets attached to each of the one or more braking arms. The system may also have a coaster track having one or more pipes, one or more frames and a rail made of non-ferrous conductive material. In such implementations, the trolley may be configured to move along the coaster track and the one or more braking arms may pivot relative to the trolley and coaster track and into a position adjacent to the rail while the trolley is moving along the coaster track, such that the movement of each braking arm relative to the rail generates eddy currents that create magnetic fields opposing movement of the trolley along the coaster track.

In some implementations, the coaster system may have a trolley with a motor that actuates the braking arms into position adjacent to the rail. The coaster system may also have a trolley with a brake pad and a motor that moves the brake pad into contact with one of the one or more pipes after the one or more braking arms pivot relative to the trolley and coaster track due to inertial force. In some implementations, the coaster system may have one or more frames that each contain a magnet. Such implementations may also include a trolley that contains a sensor that detects the magnet in each frame as the trolley moves along the coaster track. The coaster system may also include a remote server computer that determines the location of the trolley along the coaster track based on information received from the sensor and, in some implementations, the remote server computer may actuate the motor. In some implementations, the braking arms pivot relative to the trolley and coaster track due to inertial force.

In some implementations, a coaster system includes a first trolley configured with a motor and one or more braking arms operably coupled to the first trolley and having one or more magnets attached to each of the one or more braking arms, and also a second trolley configured with a motor and one or more braking arms operably coupled to the second trolley and having one or more magnets attached to each of the one or more braking arms. Such implementations may also include a coaster track having one or more pipes, one or more frames and a rail made of non-ferrous conductive material and may also have a remote server computer. In some implementations, the first trolley and second trolley may be configured to move along the coaster track. In some implementations, the one or more braking arms of the first trolley may pivot relative to the first trolley and coaster track and into a position adjacent to the rail while the first trolley is moving along the coaster track, such that the movement of each braking arm relative to the rail generates eddy currents that create magnetic fields opposing movement of the first trolley along the coaster track. In such implementations, the one or more braking arms of the second trolley may pivot relative to the second trolley and coaster track and into a position adjacent to the rail while the second trolley is moving along the coaster track, such that the movement of each braking arm relative to the rail generates eddy currents that create magnetic fields opposing movement of the second trolley along the coaster track. Such implementations may include a remote server computer that communicates with at least one of the motor of the first trolley and the motor of the second trolley to cause the motor to move the braking arms of the trolley.

In some implementations, the motor of the first trolley and the motor of the second trolley may each actuate the braking arms of each trolley into position adjacent to the rail. These implementations may also include a first trolley with a brake pad and a motor that moves the brake pad into contact with one of the one or more pipes after the one or more braking arms pivot relative to the first trolley and coaster track due to inertial force, and also a second trolley that has a brake pad and a motor that moves the brake pad into contact with one of the one or more pipes after the one or more braking arms pivot relative to the second trolley and coaster track due to inertial force. The coaster system in such implementations may also have one or more frames that each contain a magnet and each of the first trolley and the second trolley may contain a sensor that detects the magnet in each frame as the trolley moves along the coaster track. The coaster system may also include a remote server computer that determines the location of the first trolley and the second trolley along the coaster track based on information received from a sensor in each of the first trolley and the second trolley. In some implementations, the remote server computer determines the distance between each of the first trolley and the second trolley and actuates at least one of the motor of the first trolley and the motor of the second trolley to cause the motor to move the braking arms of the trolley.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
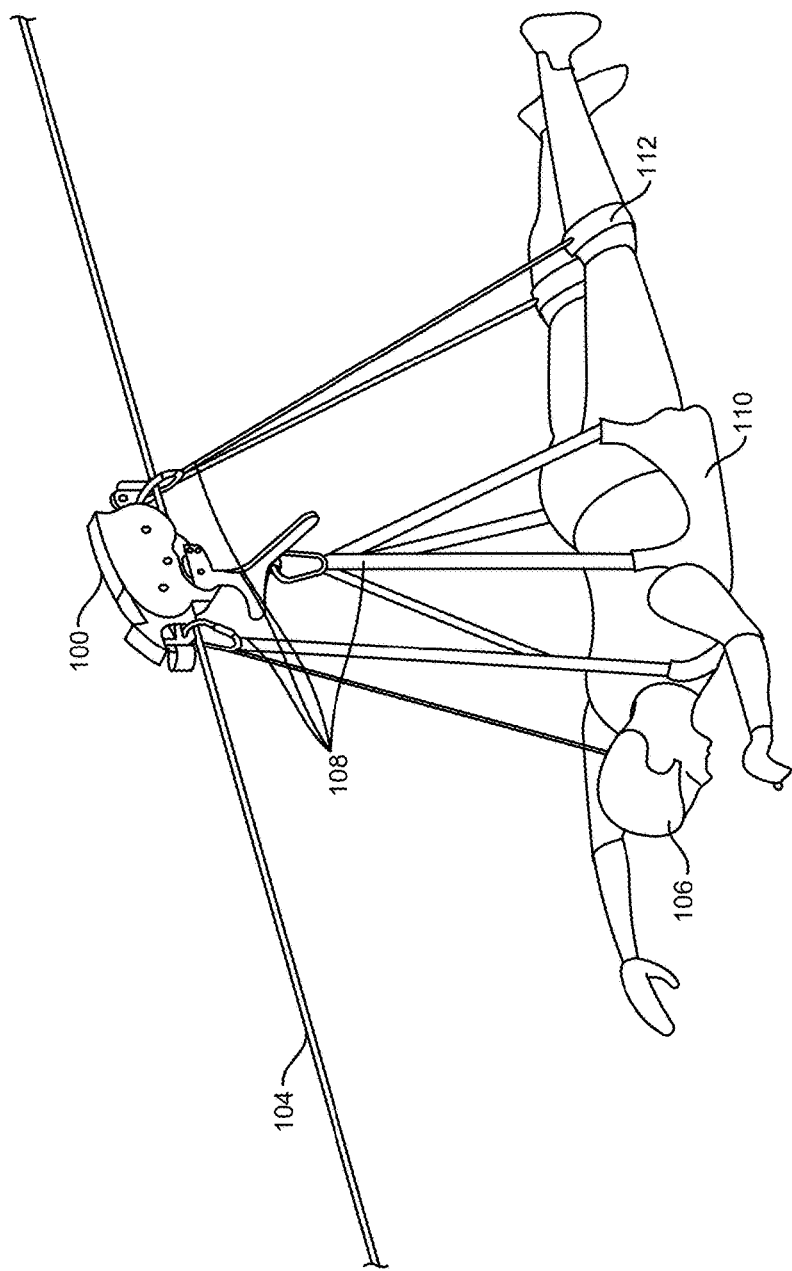
FIG. 1 illustrates a trolley in accordance with some implementations described herein and that carries a rider in a prone position.

FIG. 1 illustrates a trolley 100 (e.g., a trolley for a zip-line or coaster ride) for carrying a rider. The rider may be carried in the prone (e.g., "super hero") position and move over a track 104 (e.g., a zip-line cable or one or more coaster pipes or beams).

Figure 2:
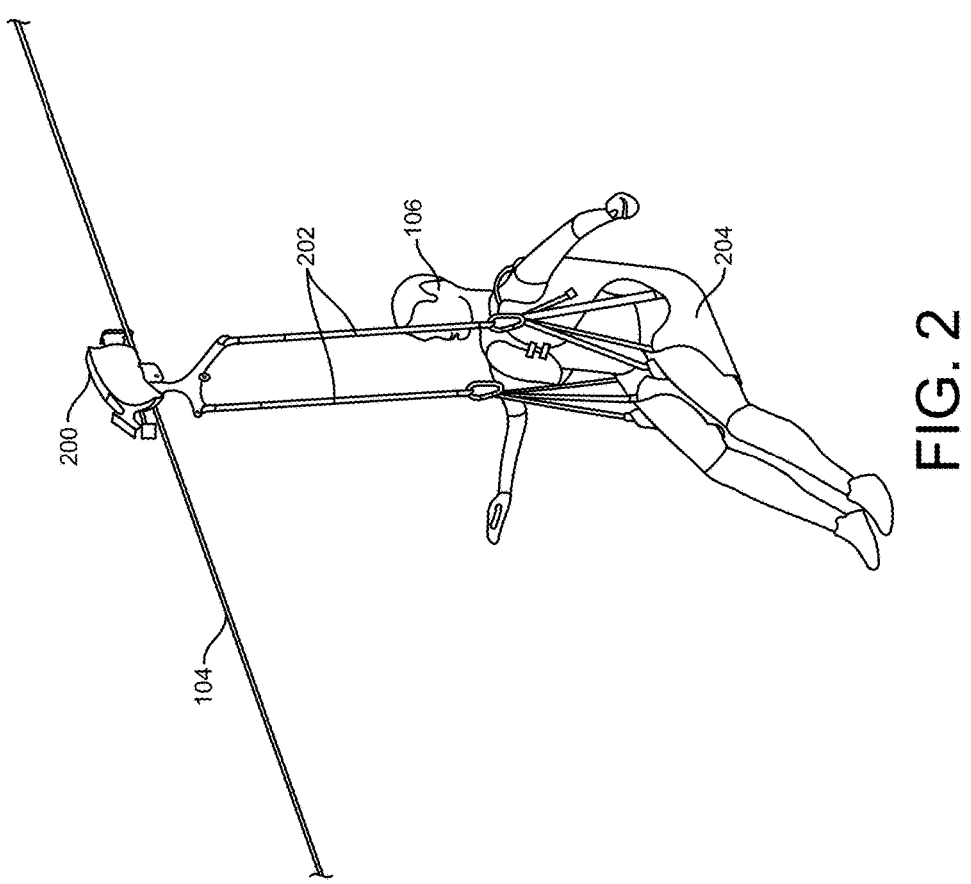
FIG. 2 illustrates a trolley in accordance with some implementations described herein and that carries a rider in a seated position.

Track 104 may be made of one or more materials suitable for a zip-line or coaster ride. Trolley 102 can maintain and have attached thereto one or more harness straps 108, a torso brace 110 and one or more leg braces 112 that together form a harness for supporting rider 106. In some implementations, a trolley 200 may be equipped with harness straps 202 and a seat brace 204 to enable rider 106 to be oriented in a sitting position, as shown in FIG. 2.

Figure 3:
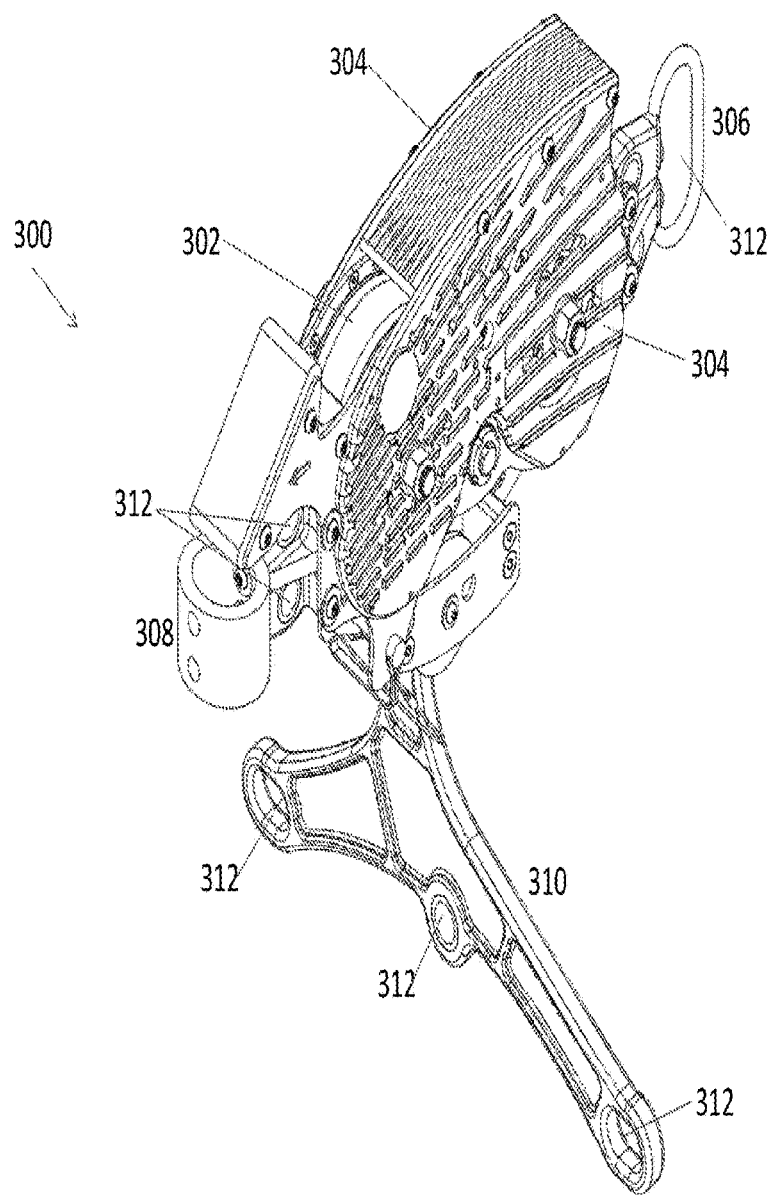
FIG. 3 illustrates structural aspects of a trolley in accordance with some implementations described herein.

FIG. 3 illustrates structural aspects of an implementation of a trolley 300 in accordance with the subject matter described herein. Trolley 300 may include one or more wheel assemblies 302 (only one is partially shown in FIG. 3), two non-ferrous plates 304 encasing the one or more wheel assemblies 302 (one of the two plates 304 is only partially shown in FIG. 3), a strap ring 306, a trolley stopper 308 and a suspension bar 310.

Non-ferrous plates 304 can be made of any non-ferrous conductive material (e.g., aluminum, copper, brass, lead, zinc or stainless steel). Strap ring 306, stopper 308 and suspension bar 310 may include one or more suspension locations 312 to which harness straps (e.g., harness straps 108 and/or harness straps 202) may be attached.

Figure 4A:
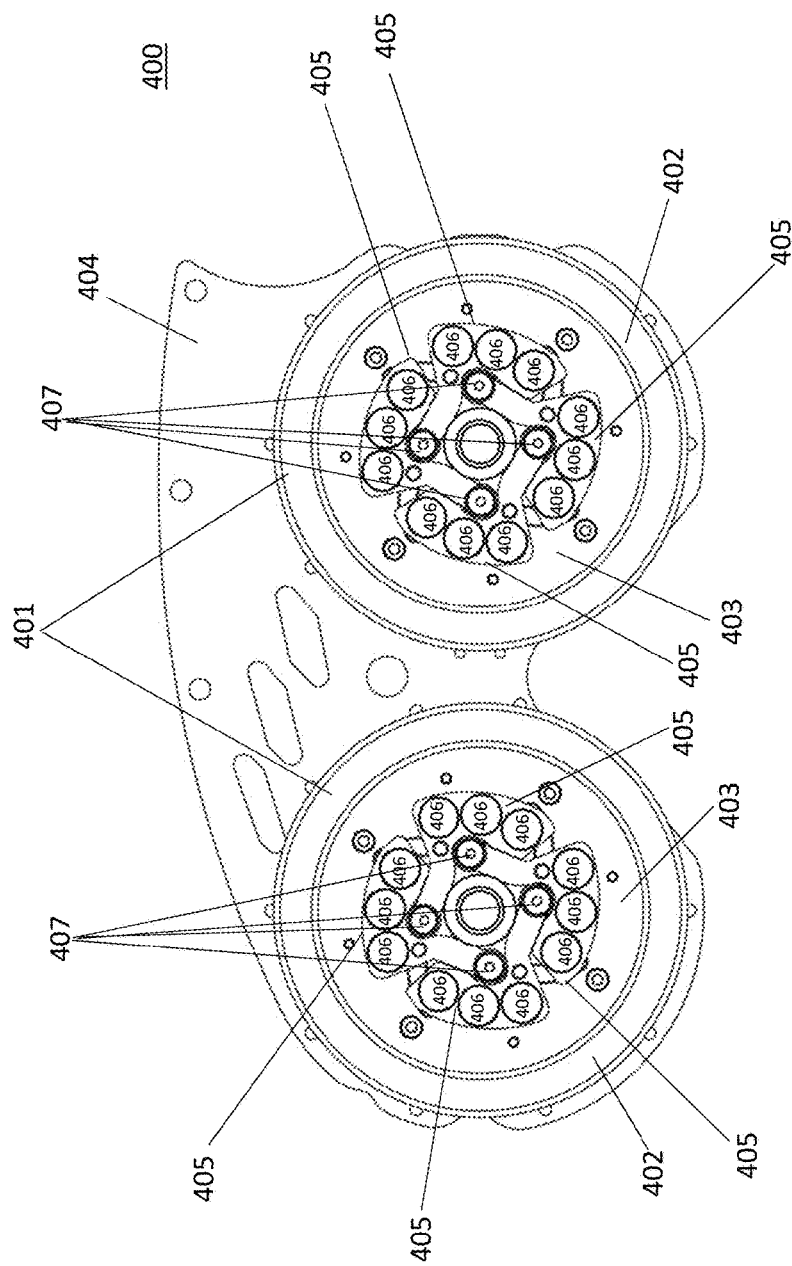
FIG. 4(a) illustrates two wheel assemblies of an apparatus in a closed position in accordance with some implementations described herein.
Figure 6:
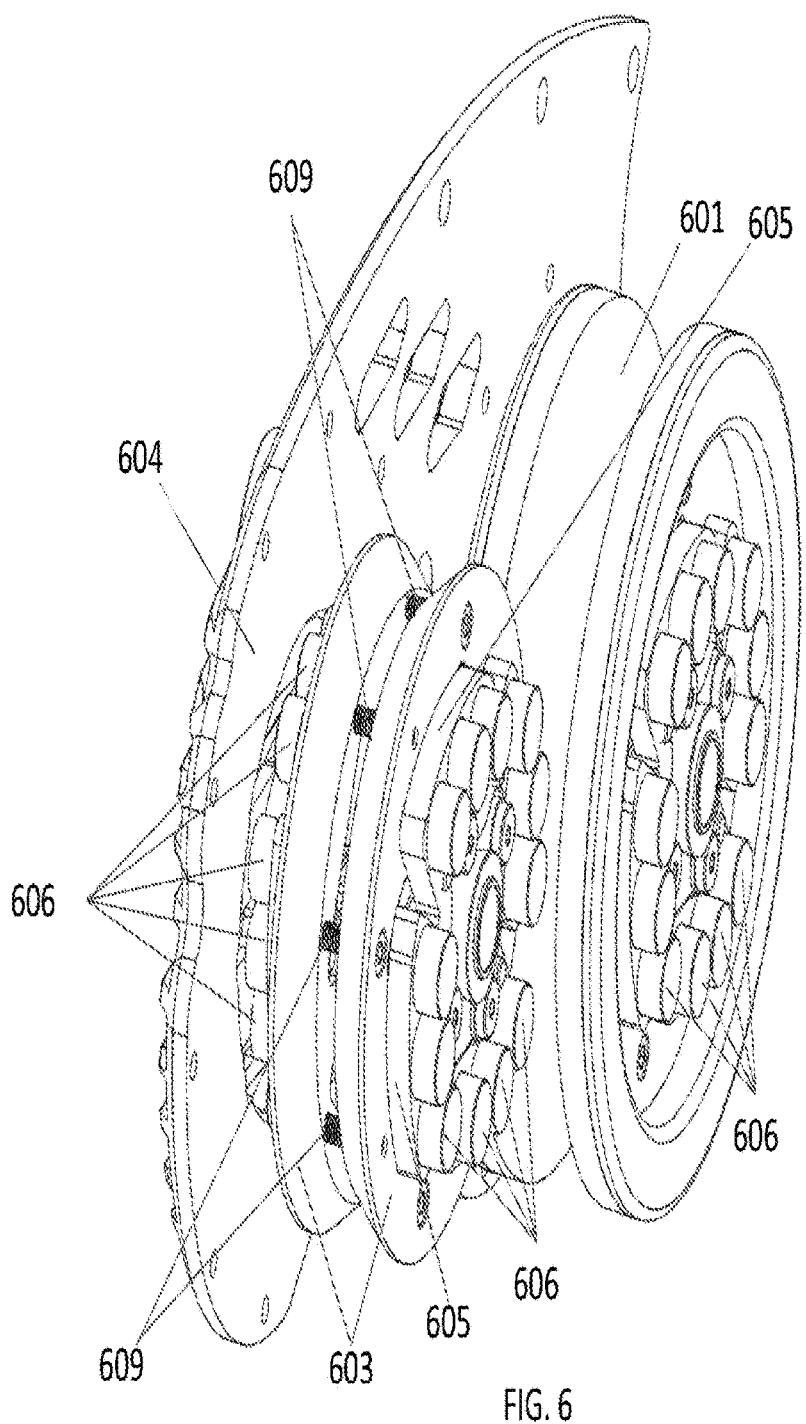
FIG. 6 illustrates a partial wheel assembly and a wheel assembly, wherein both wheel assemblies have four movable arms, each with three magnets, in a closed position, in accordance with some implementations described herein.

FIG. 4(a) illustrates an implementation of a trolley 400 in accordance with the subject matter described herein. Trolley 400 includes wheel assemblies 402 positioned adjacent to a non-ferrous plate 404, that in combination with a second non-ferrous plate (not shown) encases the one or more wheel assemblies to form the body of trolley 400. Each wheel assembly 402 includes a wheel 401 and two inner plates 403 (only one inner plate 403 for each wheel assembly 402 is shown in FIG. 4(a)). For sake of reference, FIG. 6 shows an inner plate 603 positioned within a wheel 601. Inner plate 403 may include one or more movable arms 405 that are pivotally attached to inner plate 403 at a pivot point 407. Each movable arm 405 may include one or more magnets (e.g., permanent magnets) 406 and/or a removable cartridge (not shown) insertable into the arm 405 that contains one or more magnets 406. While wheel assemblies 402 depict four movable arms 405 pivotally attached to inner plate 403, any number of movable arms 405 may be provided depending on the desired configuration and amount of braking force desired. Each moveable arm 405 is also shown with three magnets 406; however, each movable arm 405 may contain whatever number of magnets 406 as necessary for providing the desired braking force. In some embodiments, one or more magnets 406 may be contained in a removable cartridge that is inserted into a movable arm 405, rather than the one or more magnets 406 being positioned directly in the movable arm 405. In this manner, a single moveable arm can be made scalable and customizable so as to accommodate multiple configurations of magnets 406.

Wheel assemblies 402 are also shown with movable arms 405 positioned in a closed state where none of movable arms 405 are deployed to any extent. Each movable arm 405 may be biased and held in this position by some external static force, such as a spring (e.g., an extension spring or torsion spring). In this closed position, movable arms 405 and magnets 406 contained therein are directly adjacent to a first section (shown at reference numeral 502 in FIG. 5) of a non-ferrous plate 404.

When trolley 400 moves along a track so as to cause wheel assemblies 402 to rotate, that rotation will impart centrifugal force upon each movable arm 405 so as to cause each movable arm 405 to pivot about pivot point 407 when the centrifugal force is great enough so as to overcome any opposing force applied against each movable arm 405, such as frictional forces and/or spring forces.

Figure 4B:
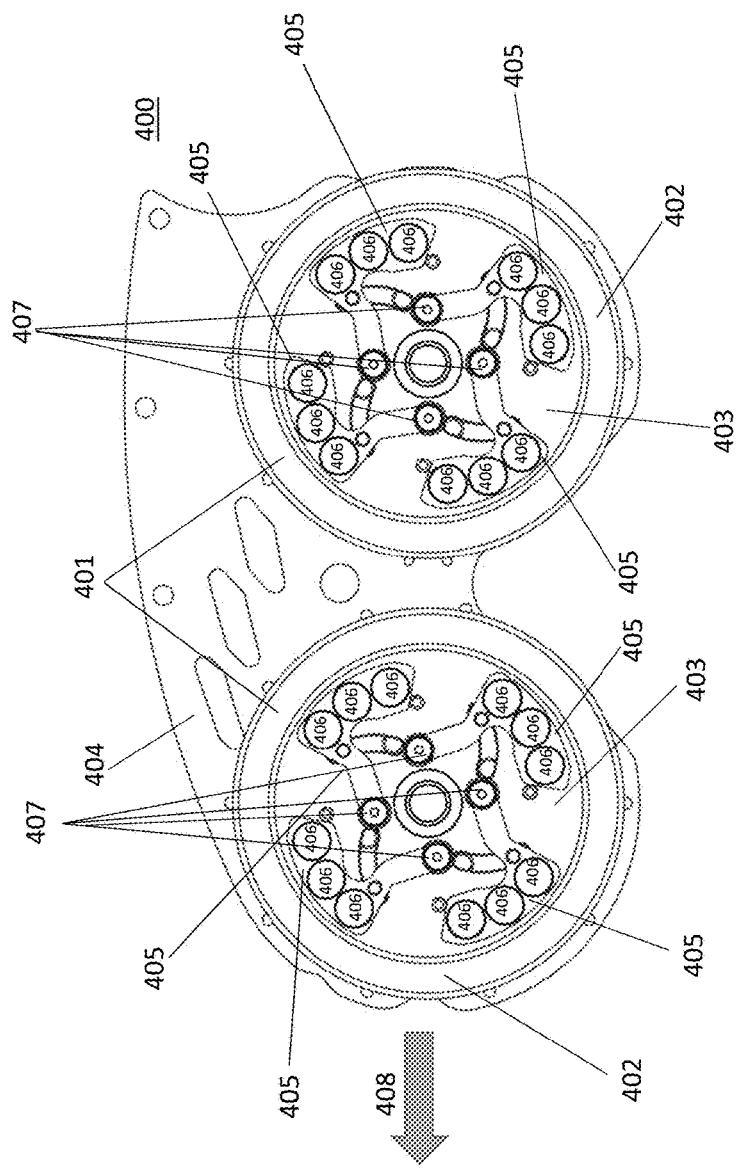
FIG. 4(b) illustrates the two wheel assemblies depicted in FIG. 4(a) in an open position in accordance with some implementations described herein.

FIG. 4(b) shows movable arms 405 being positioned in a fully deployed state such that magnets 406 are now positioned directly adjacent to a second section (shown at reference numeral 503 in FIG. 5) of non-ferrous plate 404. While FIG. 4(b) depicts movable arms 405 in a fully open position, movable arms 405 may alternately be positioned to any partially deployed extent, as well as depending on the speed of rotation of each wheel assembly 402 and the resulting centrifugal force imparted upon each movable arm 405. More specifically, when trolley 400 moves along a track in the direction of the arrow 408 shown in FIG. 4(b) so as to cause wheel assemblies 402 and inner plates 403 to rotate, movable arms 405 experience centrifugal force and pivot about pivot point 407 to move in a counterclockwise direction as indicated by the arrows shown toward the center of each wheel assembly 402. Each wheel assembly 402 may include a static force (e.g., a spring) imparted upon each movable arm 405 to control what amount of centrifugal force causes each movable arm 405 to pivot about its pivot point 407. For example, an extension spring may be attached to each movable arm 405 (see 808 in FIG. 8) to oppose the pivoting movement of movable arm 405 about its pivot point 407 to prevent sudden (e.g., jerky) movements of movable arm 405 and/or provide for controlled, progressive movement of movable arm 405 from a closed position to a partially or fully deployed position.

The progressive movement of each movable arm 405 may provide for progressive braking of each wheel assembly 402 in trolley 400 due to the interaction between the one or more magnets 406 arranged in each movable arm 405 and non-ferrous plate 404. More specifically, each magnet 406 possesses a magnetic field that extends through adjacent non-ferrous plate 404. When each magnet 406 is moved relative to nonferrous plate 404, the magnetic field of each magnet 406 moves through non-ferrous plate 404 and induces a circular flow of electric current in non-ferrous plate 404 at the leading edge of that magnet in one direction (e.g., counterclockwise) and a circular flow of electric current in non-ferrous plate 404 at the trailing edge of that magnet in the opposite direction (e.g., clockwise). These induced circular electric currents are called eddy currents and create magnetic forces within non-ferrous plate 404 in opposing directions. That is, the eddy currents at the leading edge of a magnet 406 create a magnetic force within non-ferrous plate 404 that is generally perpendicular to non-ferrous plate 404 in one direction (e.g., to the left) and the eddy currents at the trailing edge of that same magnet create a magnetic force within non-ferrous plate 404 that is generally perpendicular to non-ferrous plate 404 in the opposite direction (e.g., to the right). These opposing magnetic forces have the net result of imparting a drag force on the movement of each magnet 406 relative to non-ferrous plate 404.

The closer each magnet 406 is to non-ferrous plate 404, the greater the eddy currents generated in non-ferrous plate 404, the greater the oppositional forces generated within non-ferrous plate 404 and the greater the drag force imparted upon the movement of each magnet 406 relative to non-ferrous plate 404. It also follows that the more magnets 406 interacting with non-ferrous plate 404, the greater the eddy currents generated in non-ferrous plate 404, the greater the oppositional forces generated within non-ferrous plate 404 and the greater the drag force imparted upon the movement of each magnet 406, collectively, relative to non-ferrous plate 404. It further follows that the greater the thickness of non-ferrous plate 404 is, the greater the eddy currents generated in non-ferrous plate 404, the greater the oppositional forces generated within non-ferrous plate 404 and the greater the drag force imparted upon the movement of each magnet 406, collectively, relative to non-ferrous plate 404. Accordingly, implementations of the subject matter described herein contemplate providing for various distances between non-ferrous plate 404 and magnet(s) 406, various numbers of magnets 406 within in movable arm 405 and various thicknesses of non-ferrous plate 404 so as to provide for different amounts of braking force imparted to each wheel assembly 402.

Figure 5:
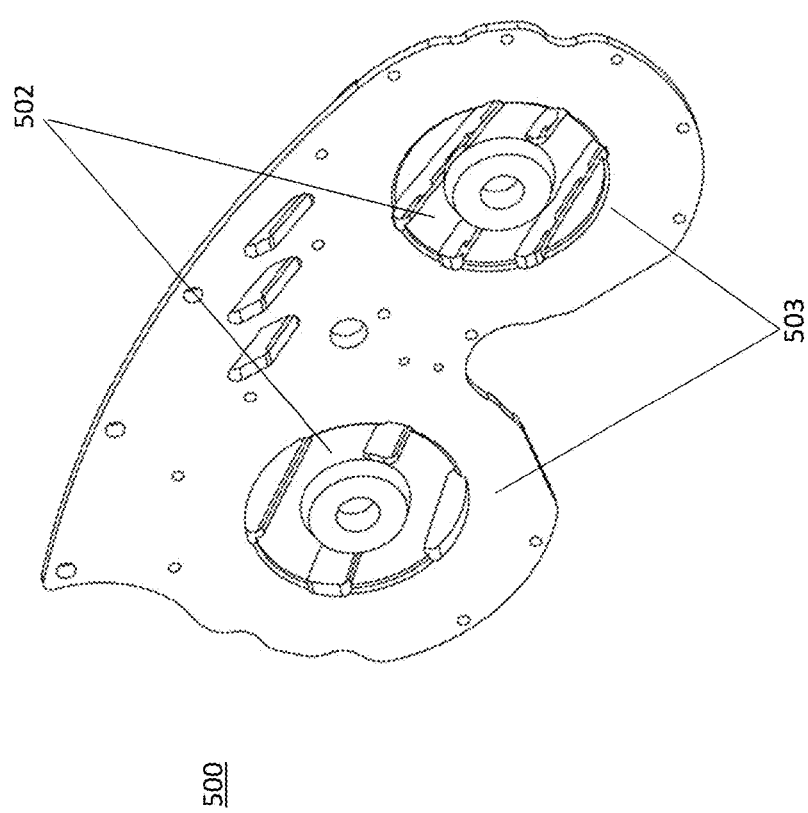
FIG. 5 illustrates an implementation of a non-ferrous conductive plate and in particular the surface of that plate that is directly adjacent to two wheel assemblies in accordance with some implementations described herein.

One way to vary the distances between non-ferrous plate 404 and one or more magnets 406 and/or the thickness of non-ferrous plate 404 is to machine a non-ferrous plate 404 with varying steps or depths. For example, as shown in FIG. 5, a non-ferrous plate 500 may have a first section 502 and a second section 503, where the first section 502 is stepped down or cut deeper in non-ferrous plate 500 than second section 503. Thus, when a wheel assembly (e.g., wheel assembly 402 shown in FIG. 4(a)) containing one or more magnets 406 is in position directly adjacent to non-ferrous plate 500, the one or more magnets 406 are physically closer to second section 503 when those magnets 406 are positioned directly adjacent second section 503 than magnets 406 are to first section 502 when magnets 406 are positioned directly adjacent to first section 502. In other words, the distance between magnets 406 and second section 503 will be less than the distance between magnets 406 and first section 502 when the magnets are directly adjacent each section, respectively. Either way, however, the implementations of the subject matter described herein involve a magnetic field always being applied and some degree of braking being applied because the magnets in the movable arms are always adjacent the non-ferrous plate so as to generate eddy currents at all times, even if minimal.

Consequently, and with reference to non-ferrous plate 500 in FIG. 5 having a stepped configuration, when movable arms 405 are in a closed position, each magnet 406 would be positioned directly adjacent to first section 502 and, upon rotation of wheel assembly 402 relative to non-ferrous plate 500, will generate eddy currents based on the magnetic fields of magnets 406 interacting with first section 502 of non-ferrous plate 500 and impart a certain drag force on the movement of those magnets 406 based on the number of magnets in the movable arms (e.g., three), the distance between those magnets 406 and first section 502 (e.g., 0.125 inches) and the thickness of the plate at first section 502. As the speed of rotation of wheel assembly 402 increases, so will the resulting centrifugal force on each movable arm 405, causing each movable arm 405 to pivot to some extent about its pivot point 407 and move outwardly from the center of wheel 401. Each magnet 406 in each movable arm 405 then moves into a position where it is adjacent second section 503 of non-ferrous plate 500. Depending on how much each movable arm 405 moves due to the centrifugal force and an applied force (e.g., a spring), some magnets 406 will be entirely directly adjacent to second section 503 and others will be only partially directly adjacent to second section 503. For example, when movable arms 405 are in a fully open position as depicted in FIG. 4(b), all magnets 406 will be essentially completely directly adjacent to second section 503 of non-ferrous plate 500 shown in FIG. 5.

Continuing with the example, as wheel assembly 402 rotates relative to non-ferrous plate 500, eddy currents will be generated based on the magnetic fields of magnets 406 interacting with first section 502 of non-ferrous plate 500 and impart a certain drag force on the movement of those magnets 406 based on the number of magnets 406 in the movable arms 405 (e.g., three) and also the distance between those magnets 406 and second section 503 (e.g., 0.0625 inches), which is closer to the magnets 406 than first section 502, that is, for example 0.0625 inches versus 0.125 inches. This closer distance provides for a greater amount of eddy currents generated per magnet 406 within second section 503 than in first section 502. In other words, as wheel assemblies 402 rotate at a greater speed, movable arms 405 pivot further outward due to greater centrifugal force and apply an increasingly greater drag force on the movement of magnets 406 (and the entirety of each wheel assembly 402) due to magnets 406 being gradually in closer proximity to non-ferrous plate 500, namely second section 503, and progressively more magnets 406 (e.g., one magnet 406 versus three magnets 406) being directly adjacent to second section 503 of non-ferrous plate 500. The thickness of the plate 404 at the second section 503 is also greater.

In this respect, trolley 400, and other trolleys and trolley systems in accordance with the subject matter described herein, may be configured to become increasingly safer (e.g., increased braking force) as the speed of the trolley increases along a zip-line or coaster track(s), due to the magnitude of the generated eddy currents being directly proportional to the speed of each magnet in the moveable arms (e.g., 405) relative to the non-ferrous plates (e.g., 500) of the trolley. The progressive braking of the wheel assemblies (e.g., 402) provides for effective braking performance for riders of varying weights, i.e., the same trolley may accommodate a rider that weighs 60 pounds, as well as a rider that weighs 300 pounds, without modifying or otherwise configuring the trolley between rides. Each rider will feel the same amount of braking force, as the gravity of their weights may apply a different force, which may aid or oppose the braking.

Implementations of the non-ferrous plates according to the subject matter described herein may have stepped sections (e.g., first section 502 and second section 503 shown in FIG. 5) of varying areas. In FIG. 5, the total area of first section 502 appears to be less than the total area of second section 503. But, in other implementations of the subject matter described herein, first section 502 depicted in FIG. 5 may have an area that is larger than that of second section 503. In general, the nonferrous plate can be designed with an internal surface that is stepped to provide any number of varying distances between the non-ferrous plates and one or more magnets positioned in a wheel assembly of a trolley or trolley system, including, for example, multiple stepped sections (e.g., more than two) or a single large section that is sloped, rather than stepped. Also, the distance between any section or portion of a non-ferrous plate and one or more magnets of a wheel assembly of a trolley or trolley system can be specifically configured to achieve any desired braking for any desired speed of rotation of the wheel assembly.

Figure 7:
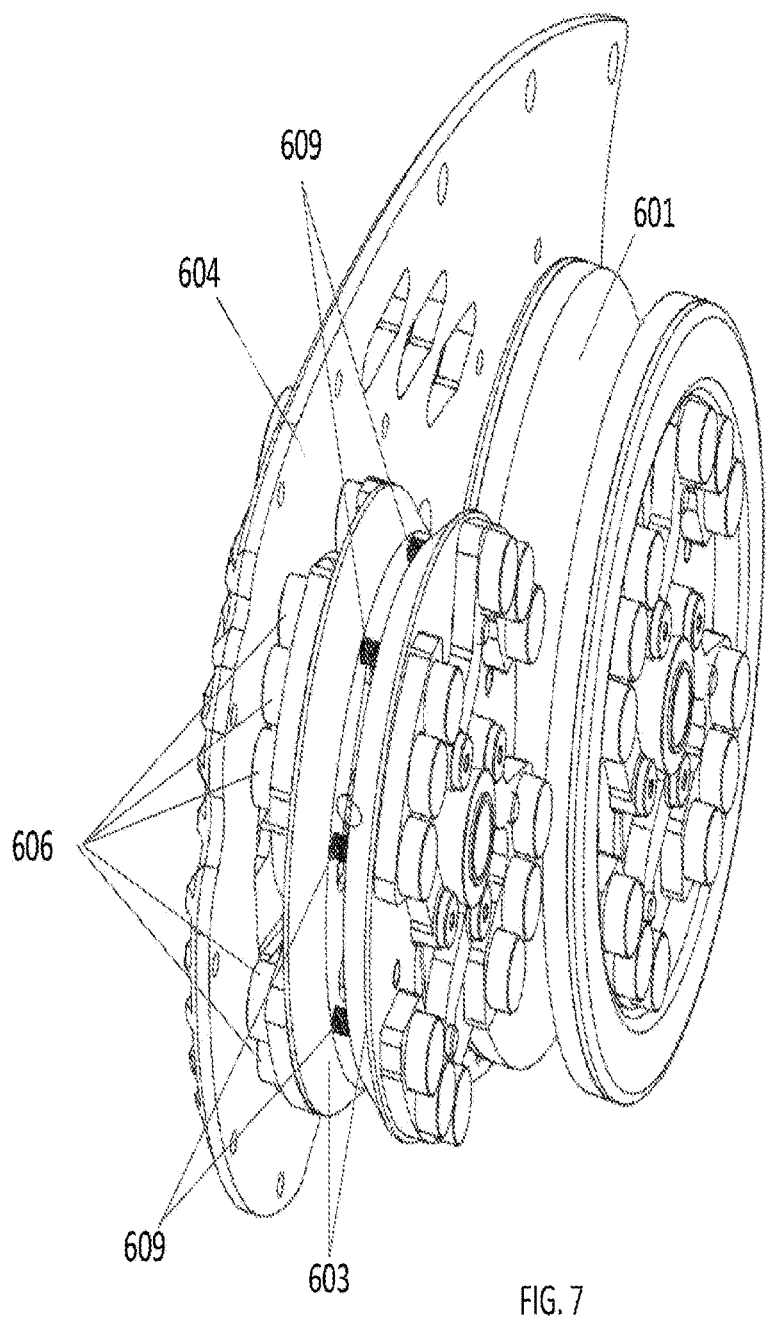
FIG. 7 illustrates the wheel assemblies depicted in FIG. 6, wherein the four movable arms are each in a fully deployed position in accordance with some implementations described herein.

FIG. 6 shows two wheel assemblies according to some implementations of the subject matter described herein. The first wheel assembly positioned in the foreground in FIG. 6 is a partial wheel assembly, as wheel 601 has been removed to better show two inner plates 603, including how inner plates 603 are positioned relative to each other and relative to wheel 601. In particular, fasteners (e.g., screws) 609 maintain inner plates 603 in place with respect to each other and within wheel 601. FIG. 6 also shows further detail of how movable arms 605 has magnets 606 are arranged on inner plates 603, particularly in a closed position. FIG. 7 illustrates the same two wheel assemblies shown in FIG. 6, but with movable arms 605 deployed in some degree of an open position.

Figure 8:
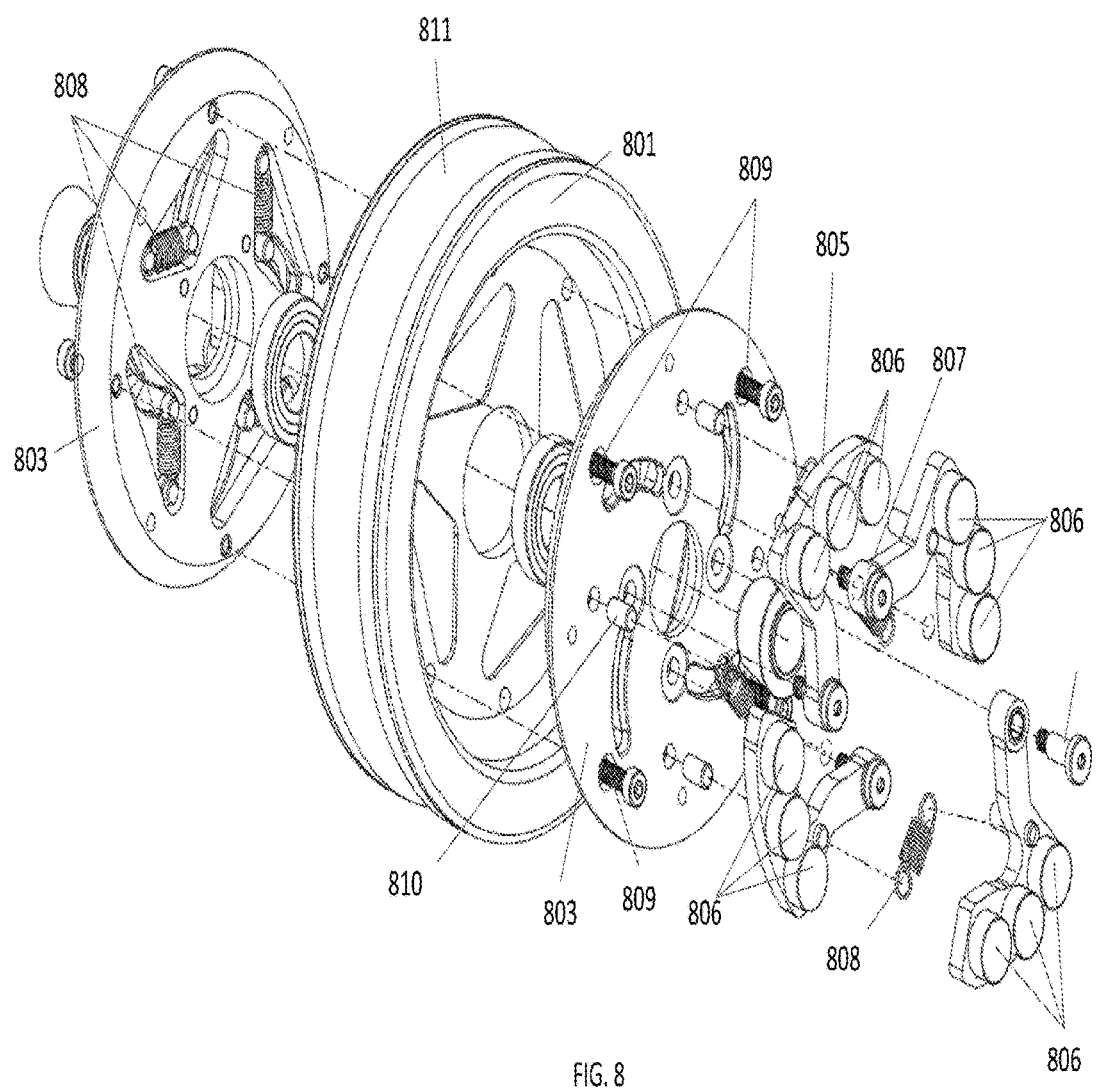
FIG. 8 illustrates an exploded view of a wheel assembly of a trolley apparatus in accordance with some implementations described herein.

FIG. 8 illustrates an exploded view of an implementation of a wheel assembly 800 according to the subject matter described herein. Wheel assembly 800 may include a wheel 801, two inner plates 803 connected to each other via fasteners 809, four movable arms 805 on each inner plate 803 that pivot about pivot points 807 (which may be fastened by any suitable means to inner plate 803), three magnets 806 on each movable arm 805, and springs 808. Each spring 808 is attached to a single movable arm 805 and a single inner plate 803 by way of a spring pin 810, as shown in FIG. 8, to prevent sudden (e.g., jerky) movements of movable arm 805 so that arms 805 smoothly (e.g., gradually) move from a closed position to an open position and, more particularly, to control at what magnitude of centrifugal force each movable arm 805 will begin to pivot about its pivot point 807. In some implementations, spring 808 may instead, or additionally, be a torsion spring incorporated with the pivot point 807.

The wheels of the trolleys or trolley systems described herein may be made of different materials, such as plastic, aluminum, steel, or any other material. The wheels can have rubber, urethane, or any other similar material outside. The wheels may have a contact portion (see 811 in FIG. 8) of any one of various profiles to accommodate various types of tracks, such as a cable, pipe or other extruded or profiled track. The texture of the contact portion may also be configured with any one of various textures. The contact portion can have any value of hardness, such as any durometer value.

FIG. 9(*a*) illustrates a coaster system 900. In some implementations, coaster system 900 may be configured with a trolley system 901 having four trolleys 902 as shown in FIG. 9(*b*). In this particular implementation, each trolley 902 includes two wheel assemblies. Some implementations may involve two trolleys connected in tandem. Some implementations may involve two trolleys connected together in tandem and also connected together in series. Trolley system 901 may move along pipes 904 by way of the wheel assemblies in each trolley 902 rolling along pipes 904, for example, in the direction shown by arrow 916 in FIG. 9(*b*). Pipes 904 may be positioned and maintained in parallel by one or more frames 906 and a main support 907. In some implementations, coaster system 900 may include only one trolley 902. In some implementations, coaster system 900 may include one or more magnets positioned on pipes 904 and/or frames 906, as discussed in further detail below. While the implementations discussed below are in terms of pipes 904 and frames 906 to provide a coaster system, the concepts disclosed herein are also contemplated for a zip line ride, whereby the trolley or trolley system travels along a zip cable and one or more fins or rails are provided above or below the trolley or trolley system to provide linear eddy current braking using a trolley having braking arms as shown in FIGS. 9(*b*), 9(*c*) and/or 9(*d*).

In some implementations, the wheel assemblies of a trolley 902 may move instead along a cable or beam.

One or more of trolleys 902 may also be configured with one or more braking arm assemblies 910, as shown for example in FIGS. 9(*b*) and 9(*c*). In some implementations braking arm assemblies 910 may be attached to a gas spring 914 and indirectly to a support bracket 912. As shown in FIGS. 9(*b*) and 9(*c*), braking arm assemblies 910 and support brackets 912 may both be connected to one or more trolleys 902. Each braking arm assembly 910 may be pivotally attached to a trolley 902 by an appropriate fastener or joint. In some implementations, support bracket 912 can be attached to a wheel assembly of trolley 902 by fasteners and be non-movable with respect to the trolley 902 to which it is attached. Gas spring 914 may pivot with respect to the braking arm assembly 910 and/or support bracket 912. Trolley system 901 may include support rollers 915 to provide additional support for maintaining each trolley 902 on pipes 904 during translation. Trolley system 901 may include one or more trolleys 902 that possess a suspension structure 908 and different types of straps (e.g., straps 108 in FIG. 1 and 202 in FIG. 2) suspended from suspension structures 908 so that riders can experience the activity in different orientations.

In some implementations, trolley 902 may be configured with braking arms 950 rigidly positioned on a braking arms support 952 as shown in FIG. 9(*d*). In this implementation, trolley 902 may have two braking arms 950 (as shown in FIG. 9(*d*)) or only one braking arm 950. Configurations with one braking arm 950 may provide for enabling a trolley 902 to go around curves, i.e., translate along curved sections of a fin 903 without braking arm 950 contacting fin 903 while traversing the curved section of fin 903. Braking arms 950 may include one or more magnets (e.g., one or more permanent magnets). In one implementation, each braking arm 950 can be scalable in that magnets can be added and removed as needed. In some implementations, a cartridge (not shown) containing one or more magnets may be inserted into an opening in a braking arm. The braking arms 950 and braking arms support 952 are movably connected to and part of trolley 902 by way of two sets of brackets, namely front brackets 954 and back brackets 956, as shown in FIG. 9(*d*), whereby only one of front brackets 954 is shown. One of front bracket 954 may include a pin 970, as shown FIG. 9(*d*). Back brackets 956 may support a brake pad 957, as shown in FIG. 9(*d*). Bracket fasteners 958 (e.g., bolts) are used to attach braking arms support 952 to front brackets 954 and back brackets 956. Front brackets 954 and back brackets 956 are moveably attached to trolley 902 by main axle bolts 960, as shown in FIG. 9(*d*). In this implementation, trolley 902 may also have a first pulley 962 and a second pulley 964 also moveably attached to trolley 902, whereby a pulley belt 966 is positioned on first pulley 962 and second pulley 964, as shown in FIG. 9(*d*). The first pulley 962 is rotated by a drive shaft (not shown) in communication with a gearbox (not shown) that is actuated by a motor 968, as shown in FIG. 9(*d*). In some implementations, second pulley 964 may include a slot 972 in which a pin 970 is positioned.

Implementations of coaster system 900 may have one or more non-ferrous track fins 903 attached to frames 906 as shown in FIGS. 9(*c*) and 9(*e*). Fins 903 may traverse the entire length of a coaster system 900 or a portion of the length of a coaster system 900, depending on the implementation. Track fins 903 may be made of any non-ferrous material, such as aluminum, copper, brass, lead, zinc or stainless steel, any combination thereof and/or the like. Fins 903 may be solid or have one or more gaps 905 that may be of equal dimension or, as shown in FIG. 9(*c*), varying dimension. Gaps 905 may get progressively wider or progressively narrower, depending on the direction of travel of the trolley system along pipes 904. One or more braking arm assemblies 910 are shown in FIG. 9(*c*) to be positioned adjacent to a single track fin 903. FIG. 9(*e*) shows a configuration of system 900 having two brake fins 903.

In some implementations, one or more trolleys may include a friction or brake pad (not shown in FIGS. 9(*b*) and 9(*c*)) to provide additional braking, including stopping the trolley and/or trolley system from moving along a zip line or coaster track(s). Brake pad 957 is shown in FIG. 9(*d*) as discussed above. The friction or brake pad can be made of cellulose, aramid, sintered glass, synthetic materials mixed with varying proportions of flaked metals, ceramics, any other friction pad material, and/or any combination thereof.

Referring to FIG. 9(*f*), the braking arm assembly 910 shown in FIGS. 9(*b*) and 9(*c*) may include one or more magnets (e.g., one or more permanent magnets) 920. In one implementation, each braking arm assembly 910 can be scalable in that magnets 920 can be added and removed as needed. In some embodiments, a cartridge (not shown) containing one or more magnets may be inserted into an opening in a braking arm assembly.

Figure 9A:
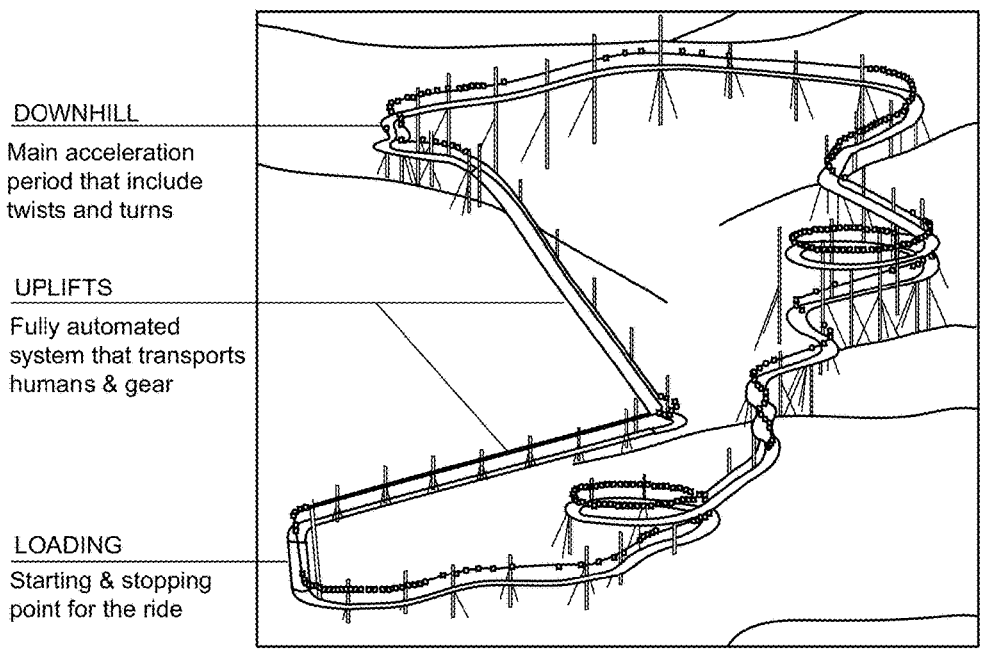
FIG. 9(a) illustrates a coaster system in accordance with some implementations described herein that includes a trolley system configured to move along it.
Figure 9B:
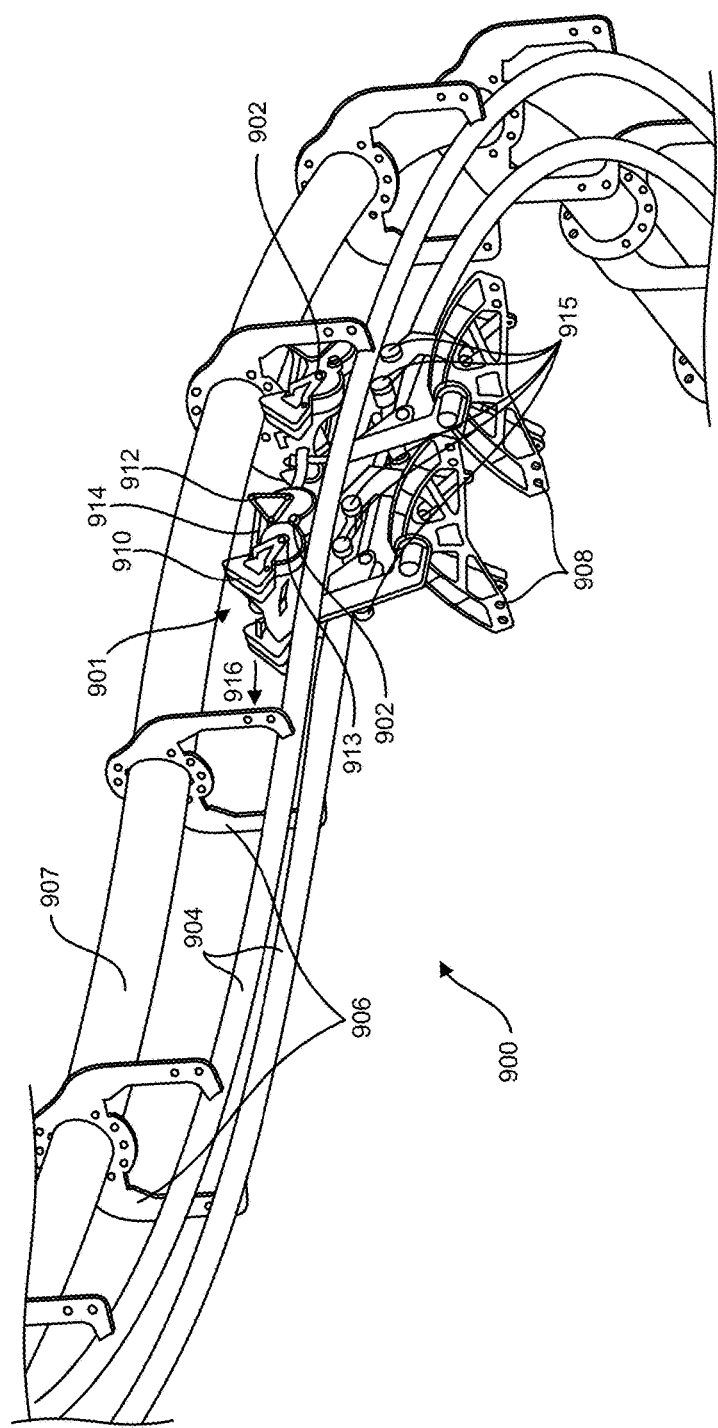
FIG. 9(b) illustrates a trolley system in accordance with some implementations described herein that includes a trolley system configured to move along pipes.
Figure 9C:
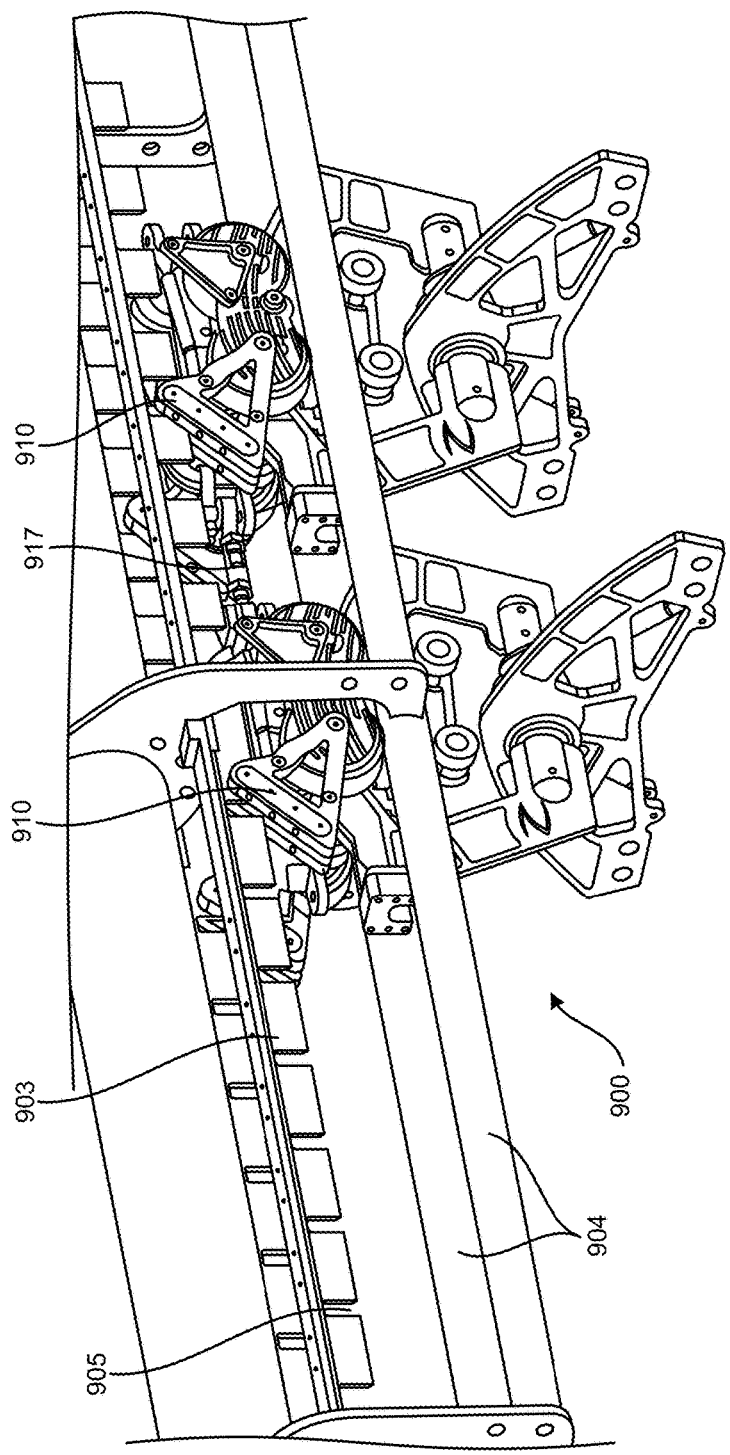
FIG. 9(c) illustrates a system in accordance with some implementations described herein that includes the trolley system depicted in FIG. 9(b) and also two overhead non-ferrous conductors that interact with the trolley system.

The one or more magnets 920 in braking arm assemblies 910 and in braking arms 950 generate eddy currents as they move relative to and adjacent to non-ferrous fin 903, as shown for example in FIGS. 9(b) and 9(c) depicting braking arm assemblies 910. In so doing, the eddy currents create an opposition force that slows down trolley system 901 moving along pipes 904. This braking force can be independent of or in addition to the braking force provided by the wheel assembly in each trolley 902. With respect to the implementation shown in FIGS. 9(b) and 9(c), while gas spring 914 associated with each braking arm assembly 910 serves to rotate each braking arm assembly 910 about pivot point 913 away from track fin 903, inertial force from the movement of trolley 902 along pipes 904, as well as initial drag force from eddy currents generated by at least one magnet in the braking arm assembly 910 interfacing with track fin 903, provides a force that rotates the braking arm assembly 910 upward toward track fin 903, so as to cause one or more of magnets 920 to interact with fin 903. The interaction and direct adjacency between magnets 920 of a braking arm assembly 910 and fin 903 can be gradual. For example, initially only a first pair of magnets 920 may interact or be immediately adjacent fin 903. Gradually, or immediately, all pairs of magnets 920 may be on both sides of fin 903, thereby causing the braking to be stronger and more effective.

Figure 9D:
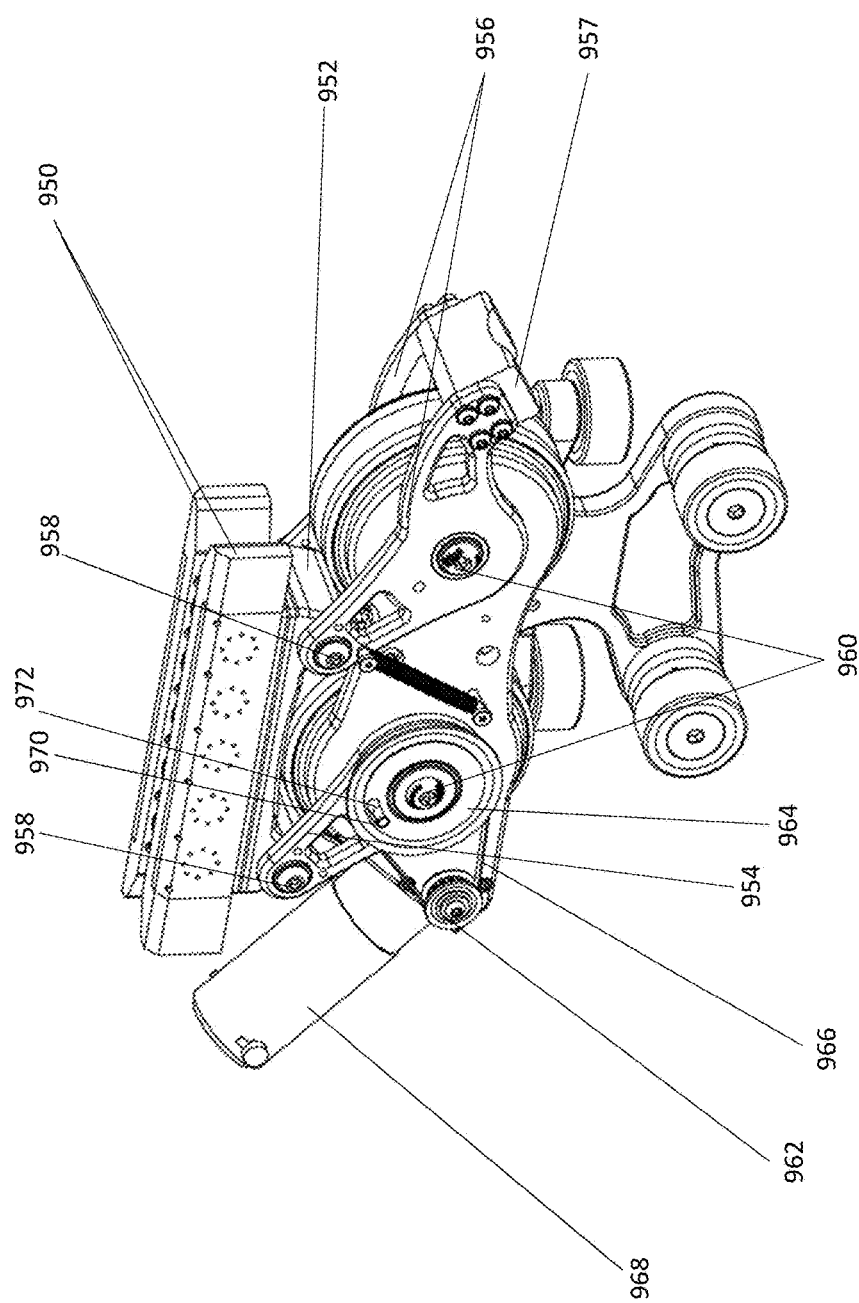
FIG. 9(d) illustrates a trolley in accordance with some implementations described herein.
Figure 9E:
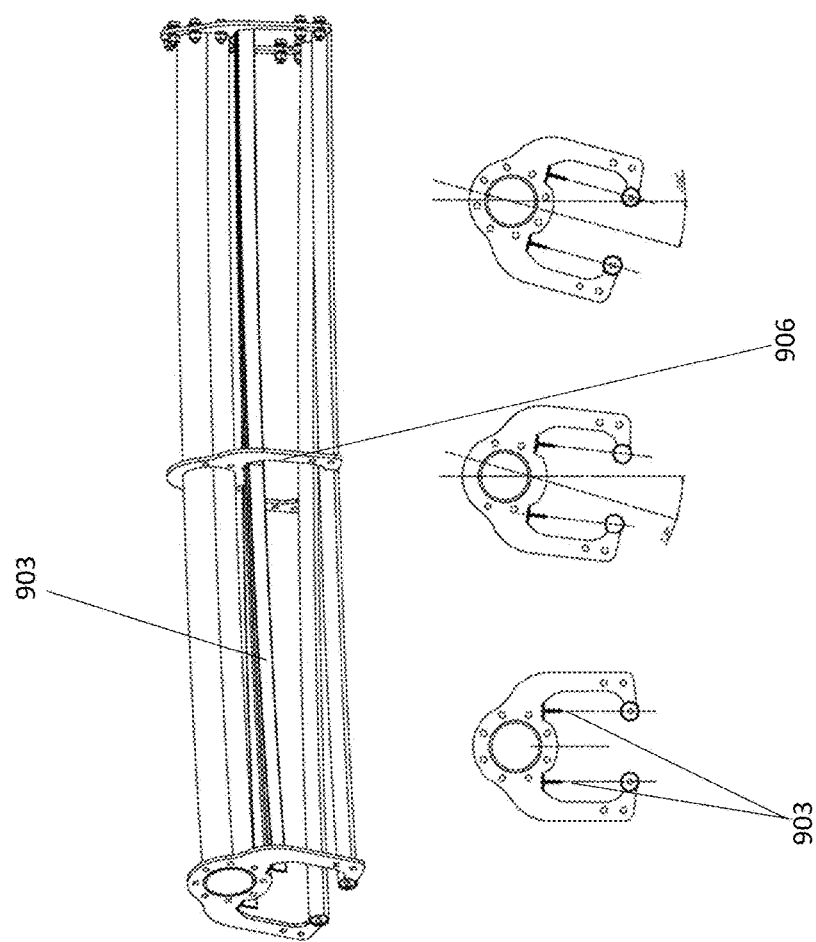
FIG. 9(e) illustrates various views of a section of a coaster track having two fins in accordance with some implementations described herein.
Figure 9F:
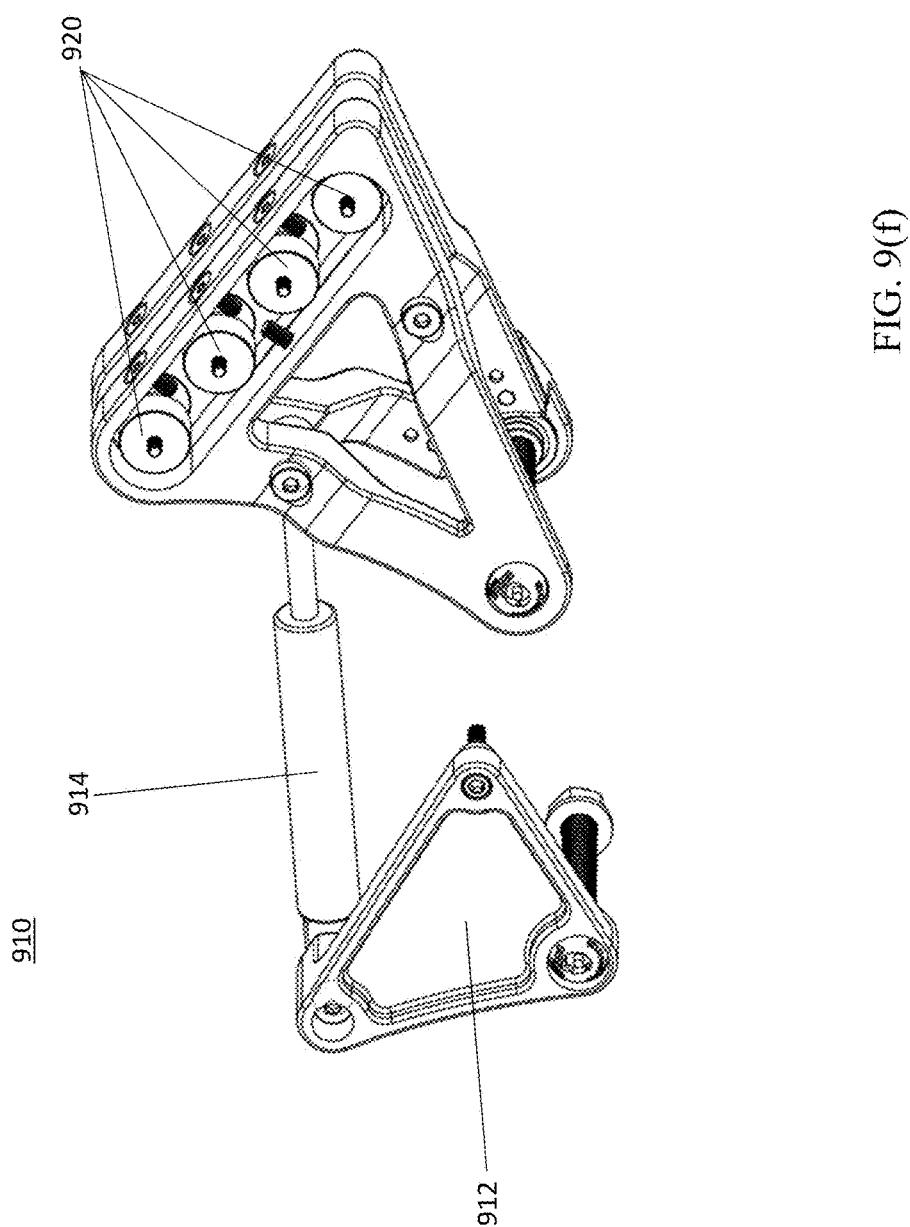
FIG. 9(f) illustrates an implementation of a braking arm assembly of the trolley system depicted in FIG. 9(b) in accordance with some implementations described herein.

In the implementation shown in FIG. 9(d), inertial force from the movement of trolley 902 along pipes 904, as well as initial drag force from eddy currents generated by at least one magnet in each braking arm 950 interfacing with a track fin 903, provides a force that moves the braking arms support 952 and, thus, braking arms 950 attached thereto, backward and upward toward track fin 903, so as to cause one or more of magnets in each braking arm 950 to interact with fin 903 extending therebetween. More specifically, front bracket 954 and back bracket 956 freely rotate or pivot clockwise about main axle bolts 960, as shown in FIG. 9(d), such that braking arms freely rotation upward into the magnetic field between the magnets in the braking arms 950 and the fin 903 to provide progressive braking due to linear eddy current braking. The interaction and direct adjacency between the magnets of a braking arm 950 and fin 903 can be gradual. For example, initially only a small portion of the magnets may interact or be immediately adjacent to a fin 903. Gradually, or immediately, all of one or more magnets may be directly adjacent to a fin and be fully interacting with a fin 903, thereby causing the braking to be stronger and more effective. In some implementations, the braking arms 950 are always slightly engaged and generating eddy currents with the fin 903 that is between them. In other implementations, the braking arms 950 are not always engaged and generating eddy currents with the fin 903; rather, the braking arms may move into and out of the magnetic field generated between the magnets of the braking arm 950 and the fin 903.

In some implementations, when the braking arms 950 interact as described due to inertial forces and/or drag forces, brake pad 957 of trolley 902 (as shown in FIG. 9(d)) is brought into contact with pipe 904 and thus employed as a means for braking. That is, back bracket 956 is dimensioned such that, even though it rotates clockwise about main axle bolt 960 to move braking arms support 952 and braking arms 950 backward and upward to further interact with a fin 903, that amount of movement does not bring brake pad 957 into contact with pipe 904. In such implementations, further movement is required, for example, by motor 968 as explained below in more detail.

In one implementation, the thickness of fins 903 can be such that a first section of fin 903 has one thickness and a second section of fin 903 has a different thickness. Additional sections of fins 903 may have still further different thicknesses, depending on the implementation, so as to provide varying degrees of braking force. In some implementations, the thickness of fins 903 can be gradually decreased—either in step/terrace form or in a continuous manner—throughout the entire length of fins 903. In some implementations, fin 903 may include two or more materials, e.g., in layers.

Some implementations of a coaster system 900 according to the subject matter of this disclosure may involve a trolley having an actuator or motor 968, instead of or in addition to gas spring 914, as shown in FIG. 9(d) and described above. While braking arms 950 can move on their own due to inertial forces, as described above, the motor 968 can also controllably and selectively move braking arms 950 further backward and upward so as to further interact with a track fin 903, i.e., to be more engaged with the fin 903 and thus create an even stronger resistance to forward movement. In so moving the braking arms 950 (and braking arms support 952) further backward and upward, braking pad 957 may also be brought into contact with pipe 904 on which trolley 902 is riding to provide further braking force. Motor 968 moves braking arms support 952 and braking arms 950 by causing first pulley 962 to rotate clockwise as depicted in FIG. 9(d). By way of pulley belt 966, rotation of first pulley 962 causes rotation of second pulley 964 clockwise, as also shown in FIG. 9(d). Second pulley 964 is rigidly fixed to front bracket 954, thus causing first bracket 954 to rotate clockwise about main axle bolt 960. Back bracket 956 will also rotate clockwise to the same extent due to its connection to braking arms support 952. Motor 968 causes over-travel of the back bracket 956 to cause the brake pad 957 to contact the pipe 904 and bring the trolley to a complete stop anywhere along the coaster system.

The timing and extent of actuation by the motor depends on what is going on during the ride and whether the circumstances warrant additional braking, e.g., if another trolley on the same coaster system 900 that is travelling in front of trolley 902 is too close or if trolley 902 is simply going too fast. In some implementations, such as the one shown in FIG. 9(d), the front bracket 954 may include a pin 970 positioned within a slot 972 in second pulley 964. Pin 970 may move within slot 972, to permit a predetermined extent of clockwise rotation of front bracket 954 and thus a predetermined extent of backward and upward movement of braking arms support 952 and braking arms 950. More specifically, the length of slot 972 can be configured to permit braking arms 950 to interact with a fin 903 based on inertial and/or drag force, and without assistance from motor 968, to a predetermined extent by allow pin 970 to travel a specific rotational clockwise distance, namely the length of slot 972.

In some implementations, rotation of second pulley 964 (by motor 968 as described above) will cause second pulley 964 to push pin 970 further clockwise, thus further moving front bracket 954, braking arms support 952, braking arms 950 and back bracket 956. In such implementations, this movement will cause brake pad 957 to contact pipe 904 and impart a braking force to trolley 902.

In some implementations, the braking force imparted by braking arms 950 due to movement of the braking arms 950 through only inertial force and/or drag force (and not through force of the motor 968) can be used to slow a trolley 902 down to a predetermined speed and, thereafter, motor 968 can be used to apply brake pad 957 to bring trolley 902 to a complete stop. This system enables a trolley 902 to be consistently brought to a complete stop using a known friction coefficient and regardless of track conditions. More specifically, the braking force imparted by braking arms 950 based on eddy current interaction with a fin 903 is not impacted by wet conditions on pipes 904. That is, while the wheels of the trolley and/or the brake pad 957 may slip or skid along wet pipes 904, the braking force applied by braking arms 950 will not be impacted by such conditions and will be able to slow down the trolley in any type of weather conditions.

In some implementations, braking arms support 952 may be configured as a brake pad, in addition to support braking arms 950. More specifically, motor 968 may be configured to move braking arms support 952 upward and in contact with fin 903 so as to create sufficient friction to slow down and/or completely stop the trolley, independent of brake pad 957.

Although discussed in the context of FIG. 9(*d*), the implementations of trolley 902 shown in FIGS. 9(*b*) and 9(*c*) may also include a motor 968 and include similar actuation. Moreover, the trolleys 902 discussed within respect to FIG. 9(*d*) may also be arranged in a trolley system 901 consisting of multiple trolleys 902 as shown in FIGS. 9(*b*) and 9(*c*).

Some implementations may further involve actuating the motor 968 using a remote computer system that interacts with and controls the motor 968. In the context of coaster system 900 shown in FIG. 9(*a*), for example, a trolley system 901 having multiple trolleys 902 may include a sensor (not shown in FIG. 9(*d*)) that detects a spatial location of trolley system 901 along pipes 904. The sensor can be activated (that is, turned on) for the entire zip-line or coaster ride. The sensor and motor 968 can be communicatively coupled to a remote server computer (e.g., a programmable logic control, or PLC) via a communication network, such as one or more of a local area network, a wide area network, internet, intranet, Bluetooth network, infrared network, any other network, and any combination thereof.

In some implementations, the sensor detects a spatial location of a trolley 902 or trolley system 901 by monitoring and recording the number of magnets that the sensor has passed or detected along the coaster system 900 since the beginning of the ride. More specifically, each frame 906 of coaster system 900 may be equipped with a magnet that is detected by the sensor as the trolley passes that particular frame 906. By detecting each magnet and maintaining this information during the ride, this information can be used to determine where a trolley system 901 or trolley 902 is along a particular coaster system 900. For example, it can be determined that the trolley system 901 just passed the 64th magnet, which is in the 64th frame (906) in the coaster system 900. Accordingly, using the information collected by the sensor, the location of a trolley system 901 along a coaster system 900 during a ride can be determined. To this end, it can also be determined where one trolley system is relative to one or more other trolley systems also moving along coaster system 900 at the same time.

The remote server computer can control the activation of the motor 968 to cause one or more braking arm assemblies 910 or braking arms 950 of the trolley system 901 to interact with a fin 903 so as to cause trolley system 901 to decelerate and even stop. In some implementations, the remote server computer can control the deactivation of the motor 968 to cause one or more braking arm assemblies 910 or braking arms 950 to pivot away from fin 903 so as to cause trolley system 901 to accelerate. Activation and deactivation of the motor 968 by the server computer may be based on the server computer identifying the location of another trolley system 901 ahead on the same track and determining whether that other trolley system is within a threshold distance, for example, but without limitation, 150 feet. If the other trolley system is within a minimum threshold distance, for example but without limitation, 150 feet, the server computer can activate motor 968 so as to cause the trolley system 901 to brake to prevent it from colliding with the trolley system ahead of it. If the distance between the trolley system 901 and the other trolley system is more than a minimum threshold distance the server computer can decide not to activate motor 968. Further, in the implementation where the braking is controlled by the remote server computer by activating and deactivating motor 968, non-ferrous fin 903 does not need to and may not include gaps 905. As explained above, spatial location of each trolley may be determined by one or more sensors in each trolley detecting and tracking magnets positioned in each frame 906 along a coaster system 900, transmitting this information in real time to the remote server computer and having the remote server computer calculate the location of the trolley. In such systems, frames 906 (and thus the magnets on those frames) are located along pipes 904 at predetermined distances, e.g., all frames 906 are 4 feet apart or are 5 feet apart.

In some implementations, rules can be predetermined and programmed into the system to maintain safety on a coaster system 900, particularly when multiple trolley systems 901 are moving along a single coaster system 900 at the same time. For example, the remote server computer can be programmed to require that all trolley systems 901 moving along a coaster system 900 at the same time must always be at least 30 magnets apart from each other, which would equate to approximately 150 feet in configurations where frames 906 are spaced in 5-foot intervals. Accordingly, when two trolley systems 901 are closer than 30 magnets to each other, the remote server computer can activate a motor 968 in one or both trolley systems 901 to reduce the speed of one or both trolley systems 901.

In some implementations of the trolleys shown in FIGS. 9(*b*) and 9(*c*), a friction pad may be included on one or more trolleys and may be actuated so as to be pressed against track fin 903 to provide additional braking force. The friction pad, for example, may be positioned on the top of a trolley and dimensioned so as to be spaced between two or more braking arm assemblies. The friction pad may also be parallel to and spaced vertically below the track fin. The friction pad may also be connected to a friction pad actuator installed on the trolley and be moved by the actuator as needed. For example, in a situation where the trolley system must be promptly decelerated or stopped, the remote server computer may signal the friction pad actuator to move the friction pad toward and against the track fin to provide additional braking force to the movement of the trolley system and/or trolley.

Figure 10:
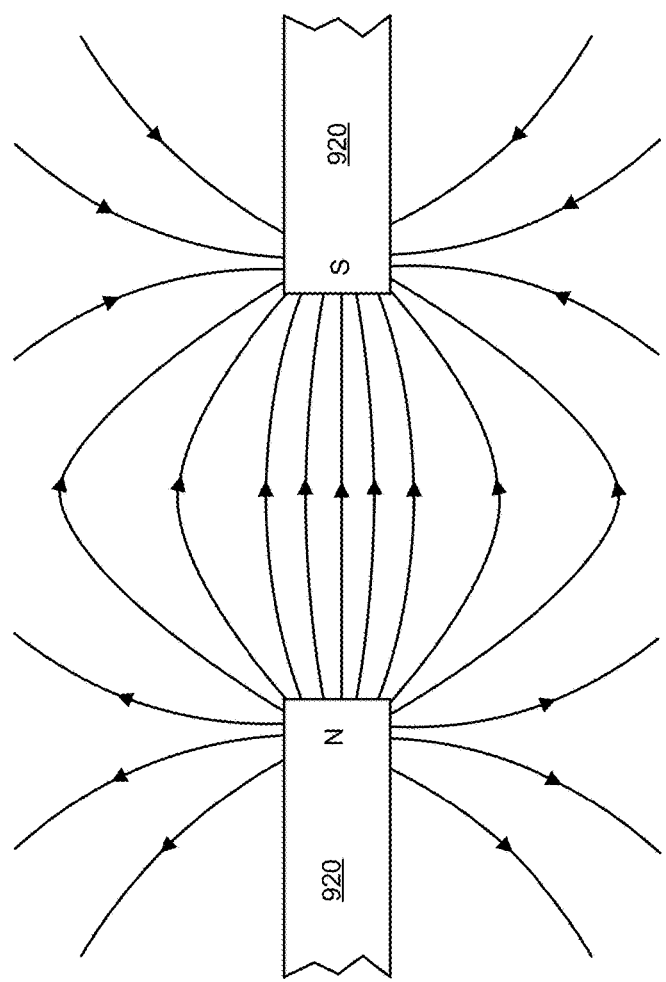
FIG. 10 illustrates the orientation and magnetic fields of two adjacent magnets positioned within a braking arm assembly in accordance with some implementations described herein.

FIG. 10 illustrates the orientation of the magnets 920 in a braking arm assembly 910 positioned one on each side of non-ferrous track fin 903. Magnets 920 may be configured to have opposite polarity as shown in FIG. 10. For example, the north pole of the left magnet 920 may face the south pole of the right magnet 920. A similar configuration may be used in the implementations described with respect to FIG. 9(*d*).

The described braking arm assemblies may be additional to the movable arms in the wheel assembly of a trolley in accordance with the subject matter disclosed herein.

As alluded to above with respect to FIGS. 9(*b*) and 9(*c*), non-ferrous fin 903 may include gaps 905 that may be configured as gradually decreasing in dimension, i.e., as the one or more braking arm assemblies 910 move along non-ferrous fin 903, gradually more non-ferrous material interacts with one or more magnets 920 in each braking arm assembly 910 to provide for gradually more braking force. Non-ferrous fin 903 can be implemented within system 900 at a preset distance from the end of the system 900 (e.g., 40-80 feet before pipes 904 end, i.e., 40-80 feet before the end of the ride) or may traverse the entire distance of the ride from start to finish, particularly in those implementations involving one or more actuators for activating one or more braking arm assemblies and that are controlled by a remote server computer. In some implementations, two or more tracks fins may be incorporated into the ride for additional braking force.

Although a few variations have been described in detail above, other modifications can be possible. For example, the logic flows or sequences described herein do not require the particular order shown, or sequential order, to achieve desirable results. Further, the features described in different implementations are interchangeable and/or additive to create further implementations, which are also within the scope of this patent application. Other implementations may be within the scope of the following claims.

What is claimed is:

1. A coaster system comprising:
   a trolley configured with one or more braking arms operably coupled to the trolley and having one or more magnets attached to each of the one or more braking arms; and
   a coaster track having one or more pipes, one or more frames and a rail made of non-ferrous conductive material,
      wherein the trolley is configured to move along the coaster track
      wherein the one or more braking arms pivot relative to the trolley and coaster track and into a position adjacent to the rail while the trolley is moving along the coaster track, such that the movement of each braking arm relative to the rail generates eddy currents when the braking arm moves into a magnetic field formed between at least one of the one or more magnets and the rail so as to oppose movement of the trolley along the coaster track, and
      wherein the trolley has a brake pad and a motor that moves the brake pad into contact with one of the one or more pipes after the one or more braking arms pivot relative to the trolley and coaster track due to inertial force.

2. The coaster system of claim 1, wherein the one or more frames each contain a magnet and the trolley contains a sensor that detects the magnet in each frame as the trolley moves along the coaster track.

3. The coaster system of claim 2, further comprising a remote server computer that determines the location of the trolley along the coaster track based on information received from the sensor.

4. The coaster system of claim 1, further comprising a remote server computer that actuates the motor.

5. A coaster system comprising:
   a trolley configured with one or more braking arms operably coupled to the trolley and having one or more magnets attached to each of the one or more braking arms; and
   a coaster track having one or more pipes, one or more frames and a rail made of non-ferrous conductive material,
      wherein the trolley is configured to move along the coaster track,
      wherein the one or more braking arms pivot relative to the trolley and coaster track and into a position adjacent to the rail while the trolley is moving along the coaster track, such that the movement of each braking arm relative to the rail generates eddy currents when the braking arm moves into a magnetic field formed between at least one of the one or more magnets and the rail so as to oppose movement of the trolley along the coaster track, and
      wherein the braking arms pivot relative to the trolley and coaster track due to inertial force.

6. A coaster system comprising:
   a first trolley configured with a motor and one or more braking arms operably coupled to the first trolley and having one or more magnets attached to each of the one or more braking arms;
   a second trolley configured with a motor and one or more braking arms operably coupled to the second trolley and having one or more magnets attached to each of the one or more braking arms;
   a coaster track having one or more pipes, one or more frames and a rail made of non-ferrous conductive material; and
   a remote server computer,
      wherein the first trolley and second trolley are configured to move along the coaster track, and
      wherein the one or more braking arms of the first trolley pivot relative to the first trolley and coaster track and into a position adjacent to the rail while the first trolley is moving along the coaster track, such that the movement of each braking arm relative to the rail generates eddy currents when the braking arm moves into a magnetic field formed between at least one of the one or more magnets and the rail so as to oppose movement of the first trolley along the coaster track,
      wherein the one or more braking arms of the second trolley pivot relative to the second trolley and coaster track and into a position adjacent to the rail while the second trolley is moving along the coaster track, such that the movement of each braking arm relative to the rail generates eddy currents when the braking arm moves into a magnetic field formed between at least one of the one or more magnets and the rail so as to oppose movement of the second trolley along the coaster track,
      wherein the remote server computer communicates with at least one of the motor of the first trolley and the motor of the second trolley to cause the motor to move the braking arms of the trolley, and
      wherein the first trolley has a brake pad and the motor of the first trolley moves the brake pad of the first trolley into contact with one of the one or more pipes after the one or more braking arms pivot relative to the first trolley and coaster track due to inertial force, and the second trolley has a brake pad and the motor of the second trolley moves the brake pad of the second trolley into contact with one of the one or more pipes after the one or more braking arms pivot relative to the second trolley and coaster track due to inertial force.

7. The coaster system of claim 6, wherein the motor of the first trolley and the motor of the second trolley each actuates the braking arms of each trolley into position adjacent to the rail.

8. The coaster system of claim 6, wherein the one or more frames each contain a magnet and each of the first trolley and the second trolley contains a sensor that detects the magnet in each frame as the trolley moves along the coaster track.

9. The coaster system of claim 6, wherein the remote server computer determines the location of the first trolley and the second trolley along the coaster track based on information received from a sensor in each of the first trolley and the second trolley.

10. The coaster system of claim 9, wherein the remote server computer determines the distance between each of the first trolley and the second trolley and actuates at least one of the motor of the first trolley and the motor of the second trolley to cause the motor to move the braking arms of the trolley.

* * * * *